US009287807B2

(12) United States Patent
Lee

(10) Patent No.: US 9,287,807 B2
(45) Date of Patent: Mar. 15, 2016

(54) APPARATUS AND METHOD OF DECREASING SPEED OF SENSORLESS BRUSH LESS DIRECT CURRENT (BLDC) MOTOR

(71) Applicant: Sang-Hyun Lee, Gyeonggi-do (KR)

(72) Inventor: Sang-Hyun Lee, Gyeonggi-do (KR)

( * ) Notice: Subject to any disclaimer, the term of this patent is extended or adjusted under 35 U.S.C. 154(b) by 0 days.

(21) Appl. No.: 14/119,519

(22) PCT Filed: Sep. 28, 2012

(86) PCT No.: PCT/KR2012/007949
§ 371 (c)(1),
(2) Date: Nov. 22, 2013

(87) PCT Pub. No.: WO2013/051830
PCT Pub. Date: Nov. 4, 2013

(65) Prior Publication Data
US 2014/0217939 A1 Aug. 7, 2014

(30) Foreign Application Priority Data

Oct. 5, 2011 (KR) .................. 10-2011-0100988

(51) Int. Cl.
*H02P 6/00* (2006.01)
*H02P 3/14* (2006.01)
(Continued)

(52) U.S. Cl.
CPC ........... *H02P 3/14* (2013.01); *H02P 6/182* (2013.01); *H02P 6/24* (2013.01)

(58) Field of Classification Search
USPC ............ 318/400.35, 400.34, 459, 599, 603, 318/400.01, 400.26, 400.17
See application file for complete search history.

(56) References Cited

U.S. PATENT DOCUMENTS 4,996,470 A * 2/1991 Rowan .................. H02P 3/18
318/757
(Continued)

FOREIGN PATENT DOCUMENTS

KR  10-0284498 B1  4/2001
KR  10-0393793 B1  8/2003
(Continued)

OTHER PUBLICATIONS

International Search Report Corresponding to PCT/KR2012/007949 mailed Feb. 27, 2013.

*Primary Examiner* — Shawki S Ismail
*Assistant Examiner* — Jorge L Carrasquillo
(74) *Attorney, Agent, or Firm* — Davis & Bujold PLLC; Michael J. Bujold

(57) ABSTRACT

Disclosed herein is an apparatus of a sensorless brush less direct current (BLDC) motor capable of rapidly driving the BLDC motor at a decreased speed. The apparatus includes: a switching unit configured to switch a direct current (DC) power depending on a plurality of pulse width modulation (PWM) signals to generate a three-phase alternating current (AC) power and apply the generated three-phase AC power to the BLDC motor to drive the BDLC motor; a plurality of voltage dividers configured to divide voltages of reverse electromotive forces generated in the BLDC motor; and a controlling unit configured to calculate a current rotation speed of the BLDC motor using output signals of the plurality of voltage dividers, generate the plurality of PWM signals depending on the calculated current rotation speed and a command rotation speed and output the plurality of PWM signals to the switching unit, divide a rotation phase angle of the BLDC motor into a speed decreasing region and a zero crossing point (ZCP) detecting region in the case of decreasing a rotation speed of the BLDC motor, decrease the rotation speed of the BLDC motor in the case in which the rotation phase angle of the BLDC motor is in the speed decreasing region, and detect ZCPs of the reverse electromotive forces in the case in which the rotation phase angle of the BLDC motor is in the ZCP detecting region. The apparatus may very rapidly decrease a speed of the BLDC motor to a required speed.

7 Claims, 6 Drawing Sheets

(51) Int. Cl.
*H02P 6/18* (2006.01)
*H02P 6/24* (2006.01)

(56) References Cited

U.S. PATENT DOCUMENTS 5,789,895 A * 8/1998 Lee .................. H02P 6/182
 318/400.34
7,567,046 B2 * 7/2009 Tojima .................. H02P 6/182
 318/400.02
8,106,612 B2 1/2012 Harada et al.
2011/0115423 A1 * 5/2011 Kern .................. F04D 27/004
 318/400.35

FOREIGN PATENT DOCUMENTS

| KR | 100393793 B1 * | 8/2003 |
| KR | 10-2011-0029407 A | 3/2011 |
| WO | 2008/120734 A1 | 10/2008 |

* cited by examiner

APPARATUS AND METHOD OF DECREASING SPEED OF SENSORLESS BRUSH LESS DIRECT CURRENT (BLDC) MOTOR

TECHNICAL FIELD

The present invention relates to an apparatus and a method of decreasing a speed of a sensorless brush less direct current (BLDC) motor capable of decreasing a rotation speed of the BLDC motor to a required speed.

BACKGROUND ART

Generally, a brush less direct current (BLDC) motor has a longer lifespan, a more constant torque at a rated speed section, and significantly higher efficiency as compared with a direct current (DC) motor. In addition, since the BLDC motor includes a permanent magnet disposed in a rotor, dynamic characteristics are excellent, a brush and the rotor are not required, and a control range of a rotation speed is wide.

However, in order to drive the BLDC motor, a dedicated BLDC motor driver should be used.

The BLDC motor driver includes a speed controlling unit and a switching unit. The speed controlling unit generates a pulse width modulation (PWM) signal for driving the BLDC motor depending on a command rotation speed and a current rotation speed of the BLDC motor. The switching unit switches a direct current (DC) power depending on the PWM signal to generate a three-phase alternating current (AC) power and applies the generated three-phase AC power to the BLDC motor to drive the BLDC motor.

In the case in which the BLDC motor driver increases a rotation speed of the BLDC motor, the speed controlling unit may control a duty ratio of the PWM signal to rapidly increase the rotation speed of the BLDC motor to a required speed.

Further, in the case in which the BLDC motor driver decreases the rotation speed of the BLDC motor, the speed controlling unit may control a duty ratio of the PWM signal to decrease the rotation speed of the BLDC motor.

However, since rotation inertia of the rotor remains in the BLDC motor, a large time is required to decrease the rotation speed of the BLDC motor to a required speed in the case in which only the duty ratio of the PWM signal is controlled.

In addition, even though an input and an output of a current to and from the BLDC motor are completely suppressed by making the duty ratio of the PWM signal 0, it is difficult to rapidly react to a given speed decreasing command due to the rotation inertia of the rotor.

In the case of rapidly driving the BLDC motor at a decreased speed, a physical speed decreasing device may be used.

However, when the speed decreasing device is used, a physical configuration is very complicated, a separate cost is required, and an influence due to noise, vibrations, and the like, may not be avoided.

DISCLOSURE

Technical Problem

An object of the present invention is to provide an apparatus and a method of decreasing a speed of a sensorless brush less direct current (BLDC) motor capable of rapidly decreasing a rotation speed of the BLDC motor to a required speed using a reverse electromotive force generated during rotation of the BLDC motor without using a separate physical speed decreasing device.

Technical Solution

According to an apparatus and a method of decreasing a speed of a sensorless brush less direct current (BLDC) motor according to the present invention, a rotation speed of a BLDC motor is rapidly decreased to a required speed using a reverse electromotive force generated in the case in which a BLDC motor is rotated.

Theoretically, in the case of connecting all of the three terminals of a three-phase BLDC motor to a single contact to form a loop, the three-phase BLDC motor very rapidly stops by the reverse electromotive force.

However, the theory for the three-phase BLOC motor described above is to very rapidly stop the three-phase BLDC motor rather than decrease a rotation speed of the three-phase BLDC motor to a required speed, and only connection of three terminals of the three-phase BLDC motor to the single contact has a limitation in decreasing the rotation speed of the three-phase BLDC motor to the required speed.

Therefore, in the present invention, a rotation phase angle of the BLDC motor is divided into a plurality regions and is then set to a speed decreasing region and a zero crossing point (ZCP) detecting region.

In addition, a speed decreasing time of the speed decreasing region is calculated based on a current rotation speed of the BLDC motor, and the speed of the BLDC motor is decreased for the calculated speed decreasing time from a point in time in which a ZCP of a reverse electromotive force generated in the BLDC motor is detected.

Here, the speed of the BLDC motor may be decreased by electrically connecting all of the three terminals of the BLDC motor to a power supply terminal. In addition, the speed of the BLDC motor may be decreased by electrically connecting all of the three terminals of the BLDC motor to a ground terminal.

In the case in which the speed decreasing time elapses, the ZCP of the reverse electromotive force generated in the BLDC motor is detected.

Further, operations of calculating a current rotation speed of the BLDC motor using a time interval from a point in time in which the speed of the BLDC motor starts to be decreased to a point in time in which the ZCP of the reverse electromotive force is detected, calculating the speed decreasing time of the speed decreasing region based on the calculated current rotation speed, decreasing the speed of the BLDC motor for the calculated speed decreasing time, and then detecting the ZCP of the reverse electromotive force are repeated, thereby making it possible to rapidly decrease the rotation speed of the BLDC motor to the required speed.

According to an exemplary embodiment of the present invention, there is provided an apparatus of decreasing a speed of a sensorless brush less direct current (BLDC) motor, including: a switching unit configured to switch a direct current (DC) power depending on a plurality of pulse width modulation (PWM) signals to generate a three-phase alternating current (AC) power and apply the generated three-phase AC power to the BLDC motor to drive the BDLC motor; a plurality of voltage dividers configured to divide voltages of reverse electromotive forces generated in the BLDC motor; and a controlling unit configured to calculate a current rotation speed of the BLDC motor using output signals of the plurality of voltage dividers, generate the plurality of PWM signals depending on the calculated current rotation speed and a command rotation speed and output the plurality of PWM signals to the switching unit, divide a rotation phase angle of the BLDC motor into a speed decreasing region and a zero crossing point (ZCP) detecting region in the case of decreasing a rotation speed of the BLDC motor, decrease the rotation speed of the BLDC motor in the case in which the rotation phase angle of the BLOC motor is in the speed decreasing region, and detect ZCPs of the reverse electromotive forces in the case in which the rotation phase angle of the BLDC motor is in the ZCP detecting region.

The speed of the BLDC motor may be decreased by allowing the switching unit to electrically connect terminals of the BLDC motor to a power supply terminal under a control of the controlling unit.

The speed of the BLDC motor may be decreased by allowing the switching unit to electrically connect terminals of the BLDC motor to a ground terminal under a control of the controlling unit.

The speed decreasing region may be set to a region from a time in which a current ZCP is detected to a time in which the next ZCP is detected, based on the current rotation speed of the BLDC motor, and the ZCP detecting region may be set to a region from a time after a time of the speed decreasing region elapses to a time in which the next ZCP is detected.

According to another exemplary embodiment of the present invention, there is provided a method of decreasing a speed of a sensorless BLDC motor, including: calculating, by a speed controlling unit, a speed decreasing time of a speed decreasing region based on a current rotation speed of the BLDC motor in the case in which a speed decreasing command of the BLDC motor is issued; controlling, by the speed controlling unit, the speed of the BLDC motor to be decreased for the speed decreasing time from a point in time in which a first ZCP of a reverse electromotive force generated in the BLDC motor is detected; detecting, by the speed controlling unit, a second ZCP in the case in which the speed decreasing time elapses; and detecting, by the speed controlling unit, the current rotation speed of the BLDC motor using a period from the point in time in which the first ZCP is detected to a point in time in which the second ZCP is detected.

The controlling of the speed of the BLDC motor to be decreased may include electrically connecting, by a switching unit, three terminals of the BLDC motor to a power supply terminal under a control of the speed controlling unit to decrease the speed of the BLDC motor.

The controlling of the speed of the BLDC motor to be decreased may include electrically connecting, by a switching unit, three terminals of the BLDC motor to a ground terminal under a control of the speed controlling unit to decrease the speed of the BLDC motor.

The speed decreasing region may be set within a time region in which the first and second ZCPs are detected.

Advantageous Effects

With the method of decreasing a speed of a sensorless BLDC motor according to the exemplary embodiment of the present invention, operations of calculating the speed decreasing time of the speed decreasing region based on the current rotation speed of the BLDC motor, decreasing the speed of the BLDC motor for the calculated speed decreasing time, and then detecting the ZCP of the reverse electromotive force to calculate the rotation speed of the BLDC motor are repeated.

Therefore, the rotation speed of the BLDC motor that is being driven may be rapidly decreased to the required speed.

DESCRIPTION OF DRAWINGS

Hereinafter, the present invention will be described in detailed through exemplary embodiments thereof with reference to the accompanying drawings, in some of which the same reference numeral will be used to describe the same component.

BEST MODE

The following detailed description is only an example and only illustrates exemplary embodiments of the present invention. In addition, a principle and a concept of the present invention are provided in order to most usefully and easily describe the present invention.

Therefore, for basic understanding of the present invention, a more detailed structure than necessary will not be provided, and several forms of the present invention that may be executed by those skilled in the art will be illustrated in the accompanying drawings.

Figure 1:
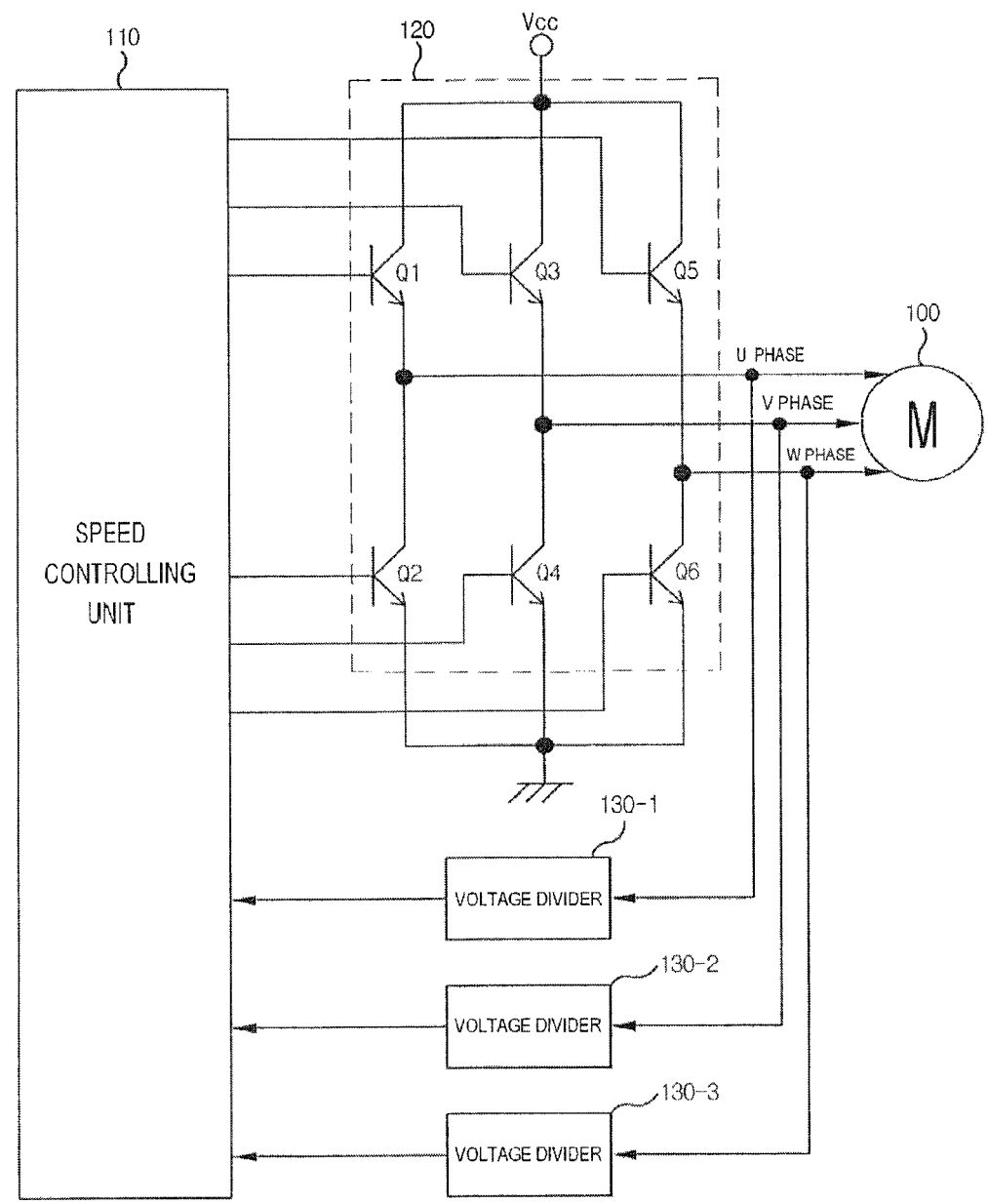
FIG. 1 is a diagram illustrating a configuration of a brush less direct current (BLDC) motor driver to which a method of decreasing a speed of a sensorless BLDC motor according to an exemplary embodiment of the present invention is applied.
Figure 2:
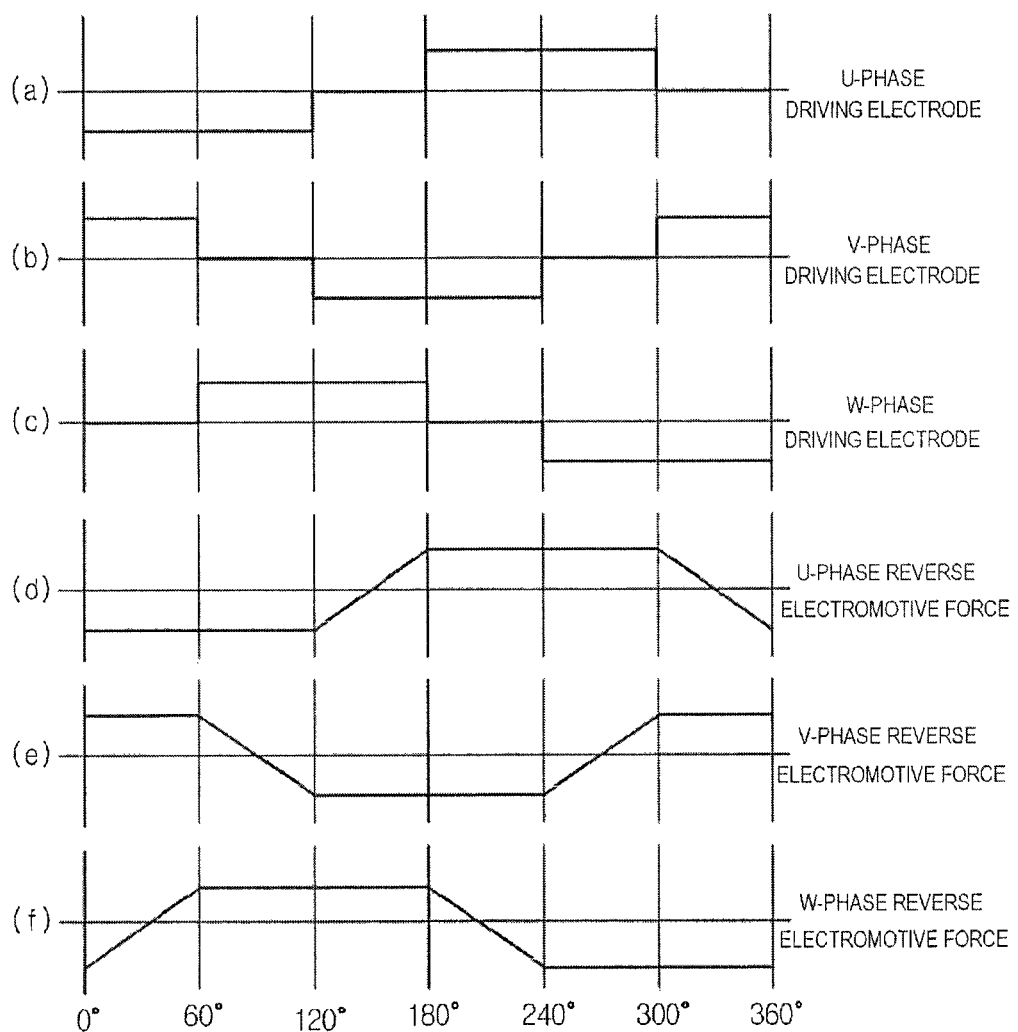
FIGS. 2A to 2F are diagrams for describing a driving power applied to a BLDC motor and a reverse electromotive force generated in the BLDC motor in the case of driving the BLDC motor.

FIG. 1 is a diagram illustrating a configuration of a brush less direct current (BLOC) motor driver to which a method of decreasing a speed of a sensorless BLDC motor according to an exemplary embodiment of the present invention is applied. In FIG. 2, a reference numeral 100 indicates a BLDC motor. For example, the BLDC motor 100 is driven by a three-phase alternating current power.

A reference numeral 110 indicates a speed controlling unit. The speed controlling unit 110 detects a current rotation speed of the BLDC motor 100 using a reverse electromotive force generated in the case in which the BLDC motor 100 is driven and generates a pulse width modulation (PWM) signal having a duty ratio depending on the detected current rotation speed and a command rotation speed to control a rotation speed of the BLDC motor 100.

A reference numeral 120 indicates a switching unit. The switching unit 120 switches a direct current (DC) power of a power supply terminal Vcc depending on the PWM signal generated by the speed controlling unit 110 to generate three-phase (that is, U-phase, V-phase, and W-phase) alternating current (AC) powers and outputs the generated three-phase (that is, U-phase, V-phase, and W-phase) AC powers to the BLDC motor 100 to drive the BLDC motor 100.

For example, in the switching unit 120, switching devices Q1 and Q2, Q3 and Q4, and Q5 and Q6 such as transistors, or the like, are connected in series with each other, respectively, between the power supply terminal Vcc and a ground, a plurality of PWM signals output from the speed controlling unit 110 are applied to bases of the switching devices Q1 to Q6, respectively, and the respective connection points of the switching devices Q1 and Q2, Q3 and Q4, and Q5 and Q6 to which three-phase (that is, U-phase, V-phase, and W-phase) powers are output are connected to three terminals of the BLDC motor 100, respectively.

Reference numerals 130-1, 130-2, and 130-2 indicate a plurality of voltage dividers, respectively. The plurality of voltage dividers 130-1, 130-2, and 130-3 divide voltage levels of U-phase, V-phase, and W-phase reverse electromotive forces generated in the case in which the BLDC motor 100 is rotated so as to be equal to or less than maximum voltage levels that may be input by the speed controlling unit 110, respectively, and input the divided U-phase, V-phase, and W-phase reverse electromotive forces to the speed controlling unit 110, respectively.

Here, the plurality of voltage dividers 130-1, 130-2, and 130-3 may be implemented in several forms. For example, the plurality of voltage dividers 130-1, 130-2, and 130-3 may be configured to divide the reverse electromotive forces in a predetermined ratio using a plurality of resistors, respectively. In this case, the speed controlling unit 110 operates an analog to digital converter to detect a zero crossing point of the reverse electromotive force.

In addition, the plurality of voltage devices 130-1, 130-2, and 130-3 may be configured to detect a point in time in which in which a neutral point voltage and a voltage of the reverse electromotive force become equal to each other using comparators. In this case, the speed controlling unit 110 detects the ZCP using output signals of the plurality of voltage dividers 130-1, 130-2, and 130-3 as interrupt signals.

In addition to the above-mentioned configuration, the plurality of voltage dividers 130-1, 130-2, and 130-3 may be variously configured.

In the following description, the case in which the plurality of voltage dividers 130-1, 130-2, and 130-3 divide voltages of the reverse electromotive forces using the plurality of resistors, respectively, will be described for convenience.

In the sensorless BLDC motor driver having the above-mentioned configuration, the speed controlling unit 110 generates a plurality of PWM signals having a predetermined duty ratio depending on a command rotation speed in the case in which the command rotation speed is input from the outside in the state in which a DC power is applied to the power supply terminal Vcc, and the plurality of PWM signals are applied to the bases of the plurality of switching devices Q1 to Q6 of the switching unit 120.

Here, the PWM signals applied to the bases of the switching devices Q1 and Q2, the PWM signals applied to the bases of the switching devices Q3 and Q4, and the PWM signals applied to the bases of the switching devices Q5 and Q6 have a phase difference of 180 degrees thereamong, respectively.

In addition, the PWM signals applied to the respective bases of the switching devices Q1 and Q2, the switching devices Q3 and Q4, and the switching devices Q5 and Q6 have a phase difference of 120 degrees thereamong, respectively.

Each of the plurality of switching devices Q1 and Q2, Q3 and Q4, and Q5 and Q6 generates three-phase AC powers while being switched depending on the plurality of PWM signals generated by the speed controlling unit 110. The switching unit 120 generates U-phase, V-phase, and W-phase driving powers each having phases as shown in FIGS. 2A to 2C.

The three-phase (that is, U-phase, V-phase, and W-phase) AC powers generated by the switching unit 120 are applied to the BLDC motor 100, and the BLDC motor 100 is driven depending on the three-phase AC powers.

In the state in which the BLDC motor 100 is driven through the above-mentioned process, the BLDC motor 100 generates U-phase, V-phase, and W-phase reverse electromotive forces, for example, as shown in FIGS. 2D to 2F.

The generated U-phase, V-phase, and W-phase reverse electromotive forces, which have voltage levels too high to be directly input to the speed controlling unit 110, are divided by the plurality of voltage dividers 130, respectively, and are then input to the speed controlling unit 110.

The speed controlling unit 110 operates an analog to digital converter (not shown) embedded therein to convert the input U-phase, V-phase, and W-phase reverse electromotive forces into digital reverse electromotive forces and detects the current rotation speed of the BLDC motor 100 using the digital reverse electromotive force.

When the current rotation speed of the BLDC motor 100 is detected, the speed controlling unit 110 compares the current rotation speed and the command rotation speed with each other to extract a control value capable of rotating the BLDC motor 100 at the command rotation speed.

In addition, the speed controlling unit 110 generates a plurality of PWM signals having a duty ratio depending on the control value and switches the switching devices Q1 to Q6 of the switching unit 120 using the plurality of PWM signals to control the BLDC motor 100 to be rotated at the command rotation speed.

In the operation as described above, whenever the BLDC motor 100 is rotated once, zero crossing points (ZCPs) at which the U-phase, V-phase, and W-phase reverse electromotive forces become 0V are generated twice, such that the ZCPs are entirely generated six times.

Figure 3:
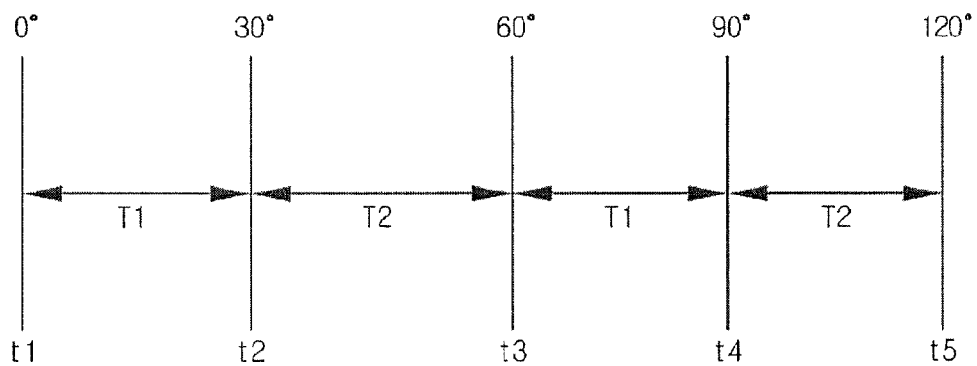
FIG. 3 is a diagram for describing operations of a speed controlling unit detecting a zero crossing point (ZCP) of the reverse electromotive force.

Therefore, the speed controlling unit 110 divides a phase depending on the rotation of the BLDC motor 100 at an angle of, for example, 60 degrees to control the rotation speed of the BLDC motor 100 while detecting the ZCPs For example, the speed controlling unit 110 operates the analog to digital converter embedded therein from 0 degree corresponding to a point in time t1 in which a phase change occurs as shown in FIG. 3 to start to detect the ZCPs of the U-phase, V-phase, and W-phase reverse electromotive forces.

When the ZCPs of the U-phase, V-phase, and W-phase reverse electromotive forces are detected in a point in time t2, which indicates that a rotation phase angle of the BLDC motor 100 is 30 degrees, the speed controlling unit 110 waits from the point in time t2 to a point in time t3 in which the next phase change occurs.

In addition, the speed controlling unit 110 repeatedly performs an operation of again operating the analog to digital converter in the point in time t3 in which the phase change occurs to start to detect the ZCPs of the U-phase, V-phase, and W-phase reverse electromotive forces and waiting to a point in time t5 in which the next phase change occurs when the ZCPs of the reverse electromotive forces are detected in a point in time t4.

That is, the speed controlling unit 110 divides a phase into a ZCP detection region T1 in which it detects the ZCP of the reverse electromotive force and a waiting region T2 in which it waits to a point in time in which the phase change occurs to control the rotation speed of the BLDC motor 100.

Figure 4:
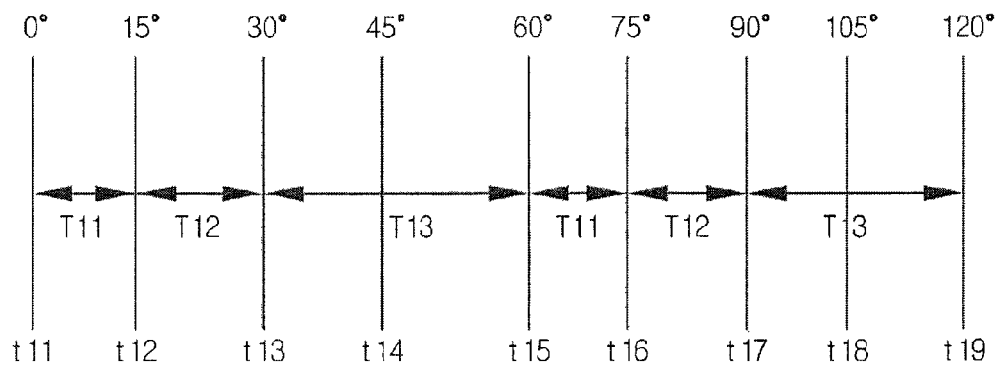
FIG. 4 is a diagram for describing exemplary operations of the speed controlling unit calculating a rotation speed of the BLDC motor by detecting the ZCP of the reverse electromotive force while decreasing the rotation speed of the BLDC motor according to the exemplary embodiment of the present invention.

FIG. 4 is a diagram for describing exemplary operations of the speed controlling unit calculating a rotation speed of the BLDC motor by detecting the ZCP of the reverse electromotive force while decreasing the rotation speed of the BLDC motor according to the exemplary embodiment of the present invention. Referring to FIG. 4, according to the exemplary embodiment of the present invention, in the case in which the rotation speed of the BLDC motor 100 is decreased, the speed controlling unit 110 divides a rotation phase angle of the BLDC motor 100 into a plurality of regions having an angle of, for example, 15 degrees.

In addition, the speed controlling unit 110 sets periods from points in time t1 and t15 in which a phase change occurs to points in time t12 and t16 in which a phase angle of the BLDC motor 100 is rotated by 15 degrees to a speed decreasing region T11 of the BLDC motor 100, sets periods from the points in time t12 and t16 to points in time t13 and t17 in which the ZCP of the reverse electromotive force is detected to a ZCP detecting region T12, and again sets periods from the points in time t13 and t17 in which the ZCP of the reverse electromotive force is detected to points in time t15 and t19 in which the next phase change occurs to a speed decreasing region T13 of the BLDC motor 100, among the plurality of divided regions.

That is, according to the exemplary embodiment of the present invention, in the case in which the rotation speed of the BLDC motor 100 is decreased, the speed controlling unit 110 sets time regions from the points in time t13 and t17 in which the ZCP of the reverse electromotive force is detected to points in times in which a rotor of the BLDC motor 100 is rotated by about 45 degrees to the speed decreasing regions T13 and T11 and sets time regions from points in time subsequent to the speed decreasing regions T13 and T11 to the points in time t13 and t17 in which the ZCP of the reverse electromotive force is detected to the ZCP detecting regions T12.

In addition, in the case in which the rotation speed of the BLDC motor 100 is decreased, the speed controlling unit 110 judges whether or not a current rotation phase angle of the BLDC motor 100 is in the speed decreasing regions T13 and T11 or is in the ZCP detecting region 12 using the points in time in which the ZCP of the reverse electromotive force is detected.

In the case in which the current rotation phase angle of the BLDC motor 100 is in the speed decreasing regions T13 and T11, the speed controlling unit 110 calculates speed decreasing times of the speed decreasing regions T13 and T11 based on the current rotation speed of the BLDC motor 100 and connects three terminals of the BLDC motor 100 to a single contact for the calculated speed decreasing times to rapidly decrease the rotation speed of the BLDC motor.

Further, in the case in which the speed decreasing times elapse, the speed controlling unit 110 does not connect the three terminals of the BLDC motor 100 to the single contact, but operates the analog to digital converter to detect the ZCP of the reverse electromotive force.

When the ZCP of the reverse electromotive force is detected, the speed controlling unit 110 calculates the current rotation speed of the BLDC motor 100 using a time from a point in time in which the rotation speed of the BLDC motor 100 starts to be decreased to the point in time in which the ZCP of the reverse electromotive force is detected.

When the current rotation speed of the BLDC motor 100 is calculated, the speed controlling unit 110 judges whether or not the current rotation speed of the BLDC motor 100 has been decreased to a required speed and repeats an operation of calculating the speed decreasing times of the speed decreasing regions to decrease the rotation speed of the BLDC motor 100 and detecting the ZCP of the reverse electromotive force in the case in which it is judged that the current rotation speed of the BLDC motor 100 has not been decreased to the required speed.

In addition, in the case in which it is judged that the current rotation speed of the BLDC motor 100 has been decreased to the required speed, the speed controlling unit 110 continuously drives the BLDC motor 100 at a decreased current rotation speed while normally generating the PWM signals.

Here, angles of the speed decreasing region and the ZCP detecting region have been described by way of example. Therefore, in practicing the present invention, the angles of the speed decreasing region and the ZCP detecting region may be variously changed if necessary.

Figure 5:
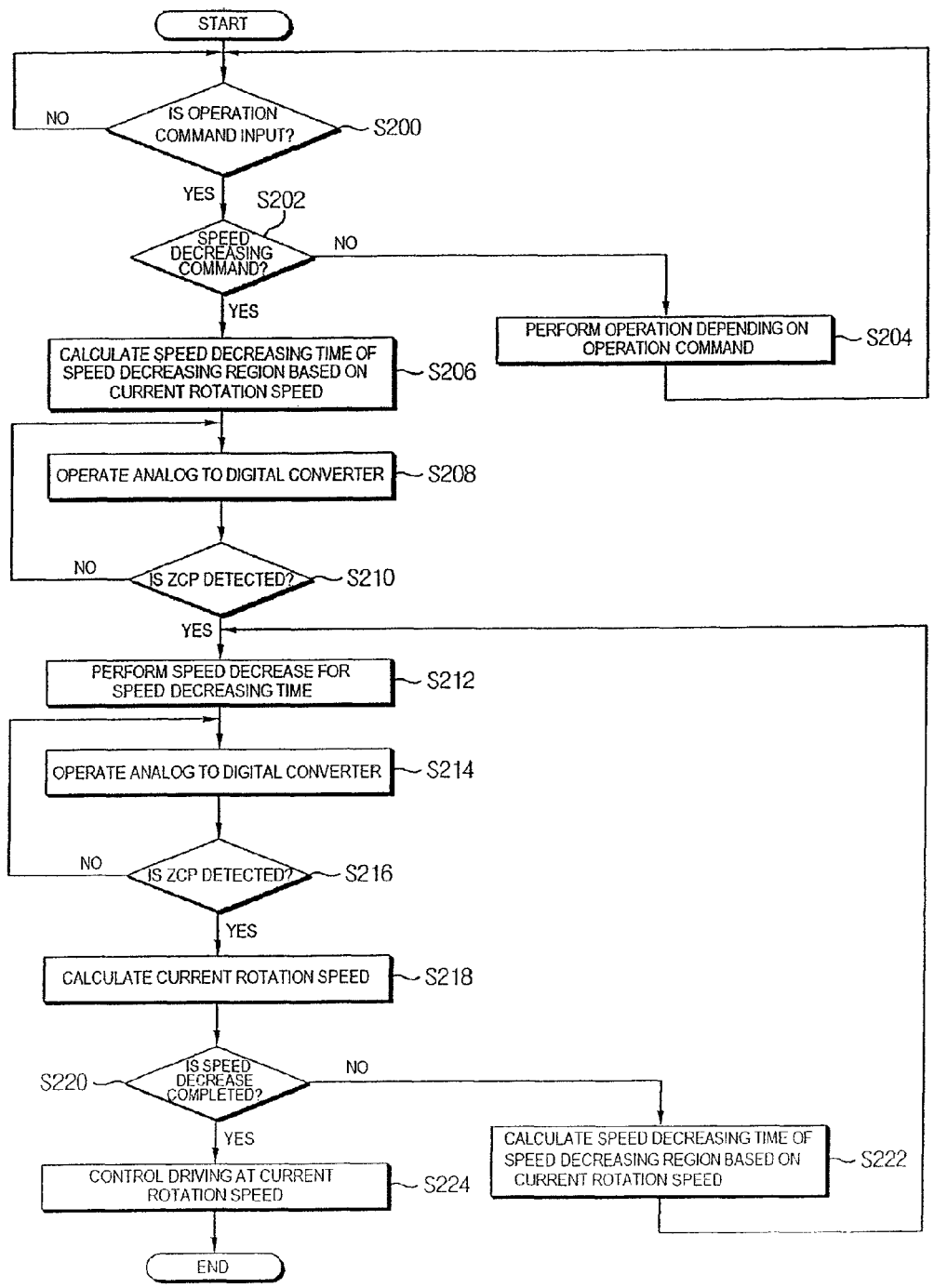
FIG. 5 is a signal flow chart showing operations of the speed controlling unit according to the method of decreasing a speed of a sensorless BLDC motor according to the exemplary embodiment of the present invention.

FIG. 5 is a signal flow chart showing operations of the speed controlling unit according to the method of decreasing a speed of a sensorless BLDC motor according to the exemplary embodiment of the present invention. Referring to FIG. 5, the speed controlling unit 110 judges whether or not an operation command has been input from an external command inputting unit (not shown), or the like (S200).

In the case in which it is judged that the operation command has been input from the command inputting unit (not shown), the speed controlling unit 110 judges whether or not the input operation command is a speed decreasing command for decreasing the rotation speed of the BLDC motor 100 (S202).

In the case in which it is judged that the input operation command is a command including a speed increasing command, or the like, other than the speed decreasing command, the speed controlling unit 110 performs a predetermined operation depending on the input operation command (S204).

On the other hand, in the case in which it is judged that the input operation command is the speed decreasing command for decreasing the rotation speed of the BLDC motor 100, the speed controlling unit 110 calculates a speed decreasing time of a speed decreasing region based on a current rotation speed of the BLDC motor 100 (S206).

Here, the speed decreasing region is set within a time region from a point in time in which a ZPC of a reverse electromotive force generated in the BLDC motor 100 is detected to a point in time which the next ZCP of the reverse electromotive force is detected.

That is, in the case in which the rotation speed of the BLOC motor 100 is decreased, the rotation speed of the BLDC motor 100 is rapidly decreased, such that a time interval of a rotation phase angle is gradually increased. Therefore, even though the rotation speed of the BLDC motor 100 is decreased in the state in which the entire time region from the point in time in which the ZPC of the reverse electromotive force is detected to the point in time which the next ZCP of the reverse electromotive force is detected is set to the speed decreasing region, the rotation speed of the BLDC motor 100 is rapidly decreased, such that the ZCP of the reverse electromotive force is detected from a time before the ZCP of the reverse electromotive force is detected. Therefore, the ZCP of the reverse electromotive force may be accurately detected.

When the speed decreasing time of the speed decreasing region is calculated, the speed controlling unit 110 operates the analog to digital converter embedded therein (S208) and judges whether or not the ZCP of the reverse electromotive force has been detected using an output signal of the analog to digital converter (S210).

When it is judged that the ZCP of the reverse electromotive force has been detected, the speed controlling unit 110 performs a speed decreasing operation for the calculated speed decreasing time to decrease the rotation speed of the BLDC motor 100 (S212).

That is, the speed controlling unit 110 switches on all of the switching devices Q1, Q3, and Q5 of the switching unit 120 in the state in which it switches off all of the switching devices Q2, Q4, and Q6 of the switching unit 120 to allow three terminals of the BLDC motor 100 to be connected to the power supply terminal Vcc, thereby making it possible to allow the rotation speed of the BLDC motor 100 to be rapidly decreased by the reverse electromotive force.

Figure 6:
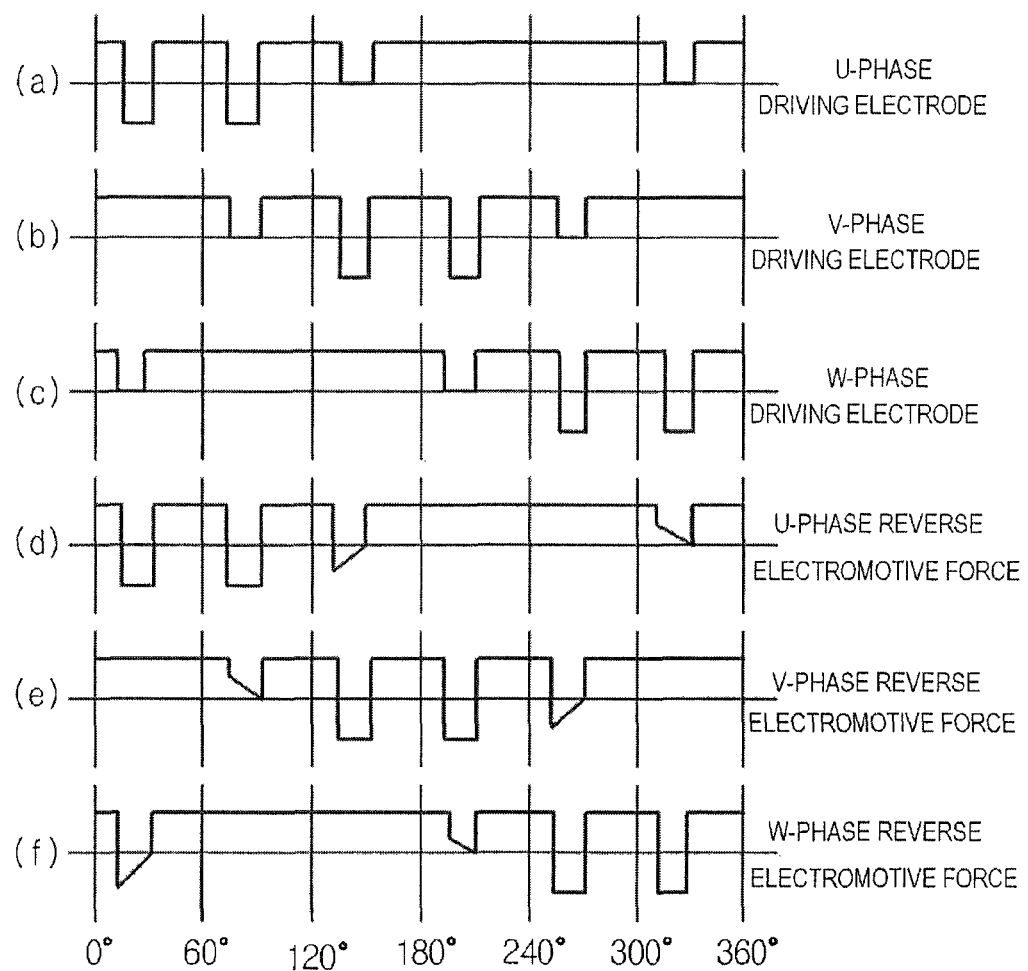
FIGS. 6A to 6F are diagrams for describing a driving power applied to the BLDC motor and a reverse electromotive force generated in the BLDC motor in the case of decreasing a rotation speed of the BLDC motor while electrically connecting three terminals of the BLDC motor to a power terminal according to the exemplary embodiment of the present invention.

FIGS. 6A to 6F are diagrams for describing a driving power applied to the BLDC motor and a reverse electromotive force generated in the BLDC motor in the case of decreasing a rotation speed of the BLDC motor while electrically connecting three terminals of the BLDC motor to a power supply terminal according to the exemplary embodiment of the present invention. U-phase, V-phase, and W-phase driving powers as shown in FIGS. 6A to 6C are applied to the BLDC motor 100, and the three terminals of the BLDC motor 100 are connected to the power supply terminal Vcc for a time of the speed decreasing region to decrease the rotation speed of the BLDC motor, such that reverse electromotive forces as shown in FIGS. 6D to 6F are generated in the BLDC motor 100.

Further, the speed controlling unit 110 switches on all of the switching devices Q2, Q4, and Q6 of the switching unit 120 in the state in which it switches off all of the switching devices Q101, Q3, and Q5 of the switching unit 120 to allow the three terminals of the BLDC motor 100 to be connected to the ground terminal, thereby making it possible to allow the rotation speed of the BLDC motor 100 to be rapidly decreased by the reverse electromotive force.

Figure 7:
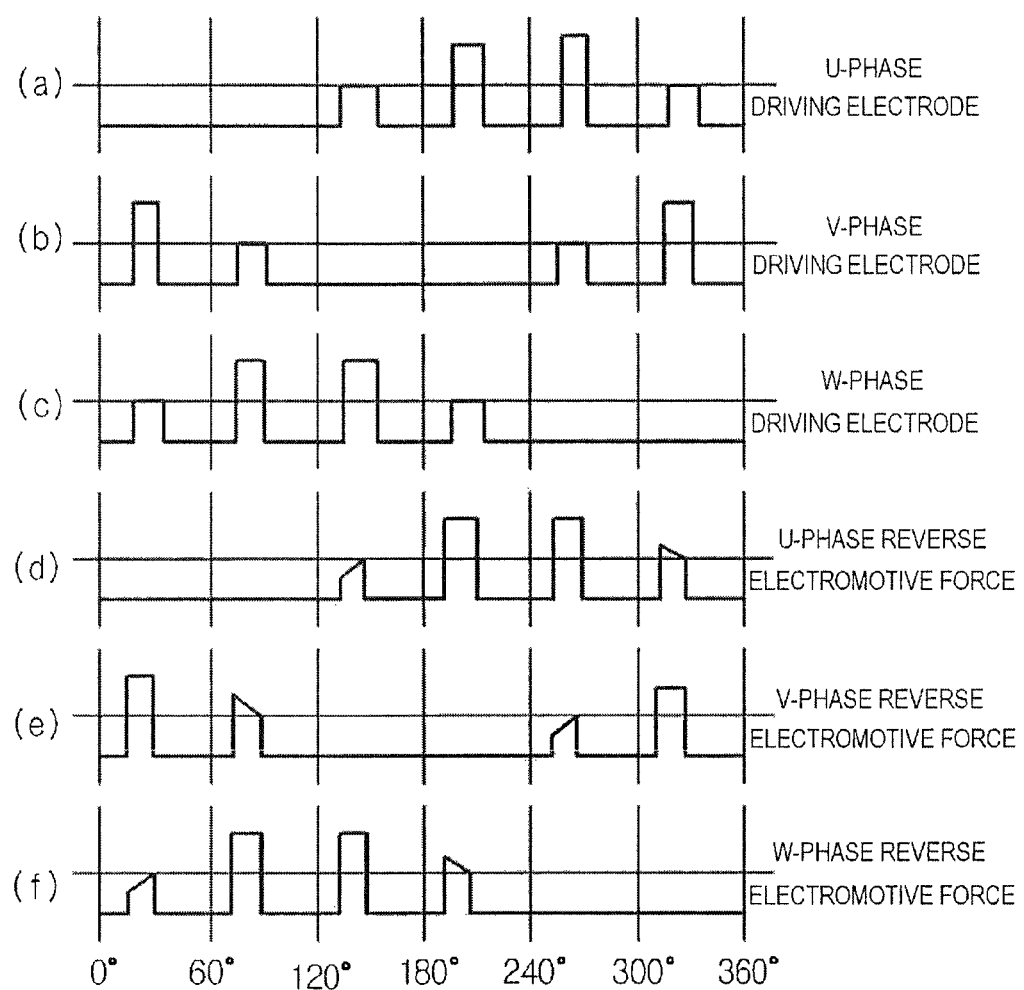
FIGS. 7A to 7F are diagrams for describing a driving power applied to the BLDC motor and a reverse electromotive force generated in the BLDC motor in the case of decreasing a rotation speed of the BLDC motor while electrically connecting three terminals of the BLDC motor to a ground terminal according to the exemplary embodiment of the present invention.

FIGS. 7A to 7F are diagrams for describing a driving power applied to the BLDC motor and a reverse electromotive force generated in the BLDC motor in the case of decreasing a rotation speed of the BLDC motor while electrically connecting three terminals of the BLDC motor to a ground terminal according to the exemplary embodiment of the present invention. U-phase, V-phase, and W-phase driving powers as shown in FIGS. 7A to 7C are applied to the BLDC motor 100, and the three terminals of the BLDC motor 100 are connected to the ground terminal for a time of the speed decreasing region to decrease the rotation speed of the BLDC motor, such that reverse electromotive forces as shown in FIGS. 7D to 7F are generated in the BLDC motor 100.

Here, since the three terminals of the BLDC motor 100 may not be connected to the single contact to detect the reverse electromotive force for the time of the speed decreasing region, in the case in which the speed controlling unit 110 decreases the rotation speed of the BLDC motor 100, it is preferable that the speed controlling unit 110 stops the operation of the analog to digital converter to prevent a power from being unnecessarily consumed.

In this state, in the case in which the speed decreasing time elapses, the speed controlling unit 110 again operates the analog to digital converter (S214) and judges whether or not the ZCP of the reverse electromotive force has been detected using an output signal of the analog to digital converter (S216).

In the case in which it is judged in S216 that the ZCP of the reverse electromotive force has been detected, the speed controlling unit 110 calculates the current rotation speed of the BLDC motor 100 using the detected ZCP of the reverse electromotive force (S218).

Here, the current rotation speed of the BLDC motor 100 is calculated using a time interval between the currently and immediately previously detected ZCPs of the reverse electromotive forces.

When the current rotation speed of the BLDC motor 100 is calculated, the speed controlling unit 110 judges whether or not the current rotation speed of the BLDC motor 100 has been decreased to a required speed depending on a speed decreasing command (S220).

In the case in which it is judged that the rotation speed of the BLDC motor 100 has not been decreased to the required speed, the speed controlling unit 110 calculates the speed decreasing time of the speed decreasing region based on the currently calculated rotation speed (S222).

In addition, the speed controlling unit 110 returns to S212 to repeatedly perform operations of decreasing the rotation speed of the BLDC motor 100 for the calculated speed decreasing time and operating the analog to digital converter after the speed decreasing time elapses to detect the ZCP of the reverse electromotive force and then calculating the current rotation speed of the BLDC motor 100 to judge whether or not the rotation speed of the BLDC motor 100 has been decreased to the required speed depending on the speed decreasing command.

In this state, in the case in which it is judged that the current rotation speed of the BLDC motor 100 has been decreased to the required speed depending on the speed decreasing command, the speed controlling unit 110 controls the BLDC motor 100 to be continuously driven at the current rotation speed (S224) and ends an operation of decreasing the rotation speed of the BLDC motor 100.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

Accordingly, the scope of the present invention is not construed as being limited to the described embodiments but is defined by the appended claims as well as equivalents thereto.

The invention claimed is:

1. An apparatus of decreasing a speed of a sensorless brush less direct current (BLDC) motor, comprising:
   a switching unit configured to switch a direct current (DC) power depending on a plurality of pulse width modulation (PWM) signals to generate a three-phase alternating current (AC) power and apply the generated three-phase AC power to the BLDC motor to drive the BDLC motor;
   a plurality of voltage dividers configured to divide voltages of reverse electromotive forces generated in the BLDC motor; and
   a controlling unit configured to calculate a current rotation speed of the BLDC motor using output signals of the plurality of voltage dividers, generate the plurality of PWM signals depending on the calculated current rotation speed and a command rotation speed and output the plurality of PWM signals to the switching unit, divide a rotation phase angle of the BLDC motor into a speed decreasing region and a zero crossing point (ZCP) detecting region in the case of decreasing a rotation speed of the BLDC motor, decrease the rotation speed of the BLDC motor in the case in which the rotation phase angle of the BLDC motor is in the speed decreasing region, and detect ZCPs of the reverse electromotive forces in the case in which the rotation phase angle of the BLDC motor is in the ZCP detecting region.

2. The apparatus of claim 1, wherein the speed of the BLDC motor is decreased by allowing the switching unit to electrically connect terminals of the BLDC motor to a power supply terminal under a control of the controlling unit.

3. The apparatus of claim 1, wherein the speed of the BLDC motor is decreased by allowing the switching unit to electrically connect terminals of the BLDC motor to a ground terminal under a control of the controlling unit.

4. The apparatus of claim 1, wherein the speed decreasing region is set to a region from a time in which a current ZCP is detected to a time in which the next ZCP is detected, based on the current rotation speed of the BLDC motor, and
the ZCP detecting region is set to a region from a time after a time of the speed decreasing region elapses to a time in which the next ZCP is detected.

5. A method of decreasing a speed of a sensorless BLDC motor, comprising:
calculating, by a speed controlling unit, a speed decreasing time of a speed decreasing region based on a current rotation speed of the BLDC motor in the case in which a speed decreasing command of the BLDC motor is issued;
controlling, by the speed controlling unit, the speed of the BLDC motor to be decreased for the speed decreasing time from a point in time in which a first ZCP of a reverse electromotive force generated in the BLDC motor is detected;
detecting, by the speed controlling unit, a second ZCP in the case in which the speed decreasing time elapses; and
detecting, by the speed controlling unit, the current rotation speed of the BLDC motor using a period from the point in time in which the first ZCP is detected to a point in time in which the second ZCP is detected;
wherein the speed decreasing region is set within a time region in which the first and second ZCPs are detected.

6. The method of claim 5, wherein the controlling of the speed of the BLDC motor to be decreased includes electrically connecting, by a switching unit, three terminals of the BLDC motor to a power supply terminal under a control of the speed controlling unit to decrease the speed of the BLDC motor.

7. The method of claim 5, wherein the controlling of the speed of the BLDC motor to be decreased includes electrically connecting, by a switching unit, three terminals of the BLDC motor to a ground terminal under a control of the speed controlling unit to decrease the speed of the BLDC motor.

* * * * *